United States Patent
Belcher

(10) Patent No.: US 8,718,931 B2
(45) Date of Patent: May 6, 2014

(54) METHOD AND APPARATUS FOR CROSS CHECKING REQUIRED NAVIGATION PERFORMANCE PROCEDURES

(75) Inventor: Robert C. Belcher, Greenwood Village, CO (US)

(73) Assignee: The Boeing Company, Chicago, IL (US)

( * ) Notice: Subject to any disclaimer, the term of this patent is extended or adjusted under 35 U.S.C. 154(b) by 1695 days.

(21) Appl. No.: 11/931,742

(22) Filed: Oct. 31, 2007

(65) Prior Publication Data

US 2009/0112464 A1   Apr. 30, 2009

(51) Int. Cl.
*G01C 21/00* (2006.01)

(52) U.S. Cl.
USPC ............... 701/442; 701/14; 701/16; 701/466; 701/528; 244/194

(58) Field of Classification Search
USPC .......... 701/205–211, 213; 340/995.1, 995.17; 244/175, 194
See application file for complete search history.

(56) References Cited

U.S. PATENT DOCUMENTS

| | | | |
|---|---|---|---|
| 6,597,294 B1 * | 7/2003 | Ariens | 340/995.26 |
| 6,643,580 B1 * | 11/2003 | Naimer et al. | 701/206 |
| 6,816,780 B2 * | 11/2004 | Naimer et al. | 701/206 |
| 6,885,313 B2 * | 4/2005 | Selk et al. | 340/945 |
| 7,212,216 B2 * | 5/2007 | He et al. | 345/629 |
| 7,414,543 B2 * | 8/2008 | Rye et al. | 340/945 |
| 7,650,232 B1 * | 1/2010 | Paielli | 701/205 |
| 7,693,618 B2 * | 4/2010 | Johnson et al. | 701/8 |
| 7,782,229 B1 * | 8/2010 | Barber | 340/979 |
| 7,830,276 B2 * | 11/2010 | Aung | 340/995.26 |
| 2008/0125962 A1 * | 5/2008 | Wipplinger et al. | 701/201 |
| 2009/0112539 A1 * | 4/2009 | Halvorson et al. | 703/8 |
| 2010/0052949 A1 * | 3/2010 | Suddreth et al. | 340/995.19 |

FOREIGN PATENT DOCUMENTS

EP         1273987 A      1/2003
WO    WO2009058442 A1    5/2009

OTHER PUBLICATIONS

Garmin, MX20 color Multi-Function Display pilots guide, Garmin Ltd., 2006.*
F. Fitzsimmons, The Electronic Flight Bag, Institute for Information Technology Applications, United States Airforce Academy, CO, 2002.*
Author unkown, "PocketFMS 0.9.64," PalmFLYING.com, Feb. 24, 2007. [Online]. Available: http://web.archive.org/web/20070224123547/http://www.palmflying.com/pockfms.html. [Accessed Aug. 4, 2011]).*
Honeywell Technical Staff, KLN 900 Pilot's Guide, Honeywell International Inc., 1999.*
D. Chandra, M. Yeh, Human Factors Considerations in the Design and Evaluation of Electronic Flight Bags (EFBs) Version 2, U.S. Department of Transportation, Sep. 2003.*
PCT search report dated Feb. 13, 2009 regarding application PCT/US2008/070823, international filing date Jul. 23, 2008, applicant reference 07-0800PCT, applicant The Boeing Company, 4 pages.

* cited by examiner

*Primary Examiner* — Thomas Black
*Assistant Examiner* — Peter D Nolan
(74) *Attorney, Agent, or Firm* — Yee & Associates, P.C.

(57) ABSTRACT

A computer implemented method, apparatus, and computer usable program product for cross checking required navigation performance procedures. A required navigation performance procedure in a flight management system is executed in an aircraft. A global positioning system signal in an electronic flight bag or other independent data processing system located onboard the aircraft is received while executing the required navigation performance procedure. A current position of the aircraft based on the global positioning system signal is presented on a moving map. A set of containment lines on the moving map are displayed to indicate whether deviations from the required navigation performance procedure have occurred.

19 Claims, 5 Drawing Sheets

METHOD AND APPARATUS FOR CROSS CHECKING REQUIRED NAVIGATION PERFORMANCE PROCEDURES

BACKGROUND INFORMATION

1. Field

The present disclosure relates generally to an improved data processing system and in particular to a method and apparatus for processing data regarding movement of an aircraft. Still more particularly, the present disclosure relates to a computer implemented method, apparatus, and computer usable program product for cross checking required navigation performance procedures.

2. Background

Required navigation performance is a statement about navigation performance necessary for operation within a defined airspace. Required navigation performance provides a process for implementing routes and flight paths that differ from currently used systems in which ground based navigational facilities are employed. Required navigational performance utilizes global positioning satellite data to calculate the position of an aircraft. This position is compared to positional information calculated by other equipment on the aircraft, including inertial navigation systems and distance measuring equipment. The closeness of the calculated positions determines the level of precision for navigational information.

Aircraft using required navigation performance systems may safely operate routes with less separation than is currently required with other navigation systems employing ground-based navigation facilities. This type of system allows for the number of aircraft that can safely use a particular airspace to increase. This type of system may accommodate increasing demand for air traffic capacity.

The level of navigational precision is represented in terms of RNP units. A level of 1.0 RNP is equivalent to an accuracy requiring six thousand feet of separation on either side of an aircraft. A RNP of 0.3 represents increased accuracy and only requires eighteen hundred feet of separation on either side of an aircraft. Currently, when a RNP of 0.3 or less is present, the pilot is no longer flying the aircraft. In this situation, a flight management system executes a required navigation performance procedure to fly the aircraft.

A RNP level of 0.1 requires only six hundred feet of separation on either side of the aircraft. This level is currently the most accurate RNP level used.

An aircraft is guided along a required navigational performance approach procedure path by onboard management systems. These systems are certified navigation computers coupled to the auto pilot system of an aircraft. Flight management systems use their own separate navigational databases and current aircraft position information to guide the aircraft along a predetermined three-dimensional path. The flight management system accomplishes this process by comparing the aircraft's current position in heading to the predetermined approach path. The flight management system may make appropriate adjustments as needed to maintain the path defined by the procedure.

SUMMARY

The advantageous embodiments of the present disclosure provide a computer implemented method, apparatus, and computer usable program product for cross checking required navigation performance procedures. A required navigation performance procedure in a flight management system is executed in an aircraft. A global positioning system signal in an electronic flight bag located onboard the aircraft is received while executing the required navigation performance procedure. A current position of the aircraft based on the global positioning system signal is presented on a moving map. A set of containment lines on the moving map are displayed to indicate whether deviations from the required navigation performance procedure have occurred.

In another advantageous embodiment, a method for cross checking required navigation performance procedures comprises executing a required navigation performance procedure in a flight management system in an aircraft. A location signal is received for the aircraft. An independent check of the required navigation performance procedure in an independent data processing system from the flight management system using the location signal during execution of the required navigation performance procedure is executed to form a set of results. An indication is generated of whether a current position of the aircraft is within a threshold for the required navigation performance procedure from the set of results.

In yet another advantageous embodiment, an apparatus comprises a flight management system capable of executing a required navigation performance procedure and a data processing system independent of the flight management system. The data processing system receives a location signal for an aircraft; executes an independent check of the required navigation performance procedure in an independent data processing system from the flight management system using the location signal during execution of the required navigation performance procedure to form a set of results. The data processing system generates an indication of whether a current position of the aircraft is within a threshold for the required navigation performance procedure from the set of results.

In still yet another advantageous embodiment, a computer program product for cross checking required navigation performance procedures is present in which the computer program product comprises a computer recordable media and program code. The program code includes code to execute a required navigation performance procedure in a flight management system in an aircraft. The program code also includes code to receive a location signal for the aircraft and execute an independent check of the required navigation performance procedure in an independent data processing system from the flight management system using the location signal during execution of the required navigation performance procedure to form a set of results. The program code includes code to generate an indication of whether a current position of the aircraft is within a threshold for the required navigation performance procedure from the set of results.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
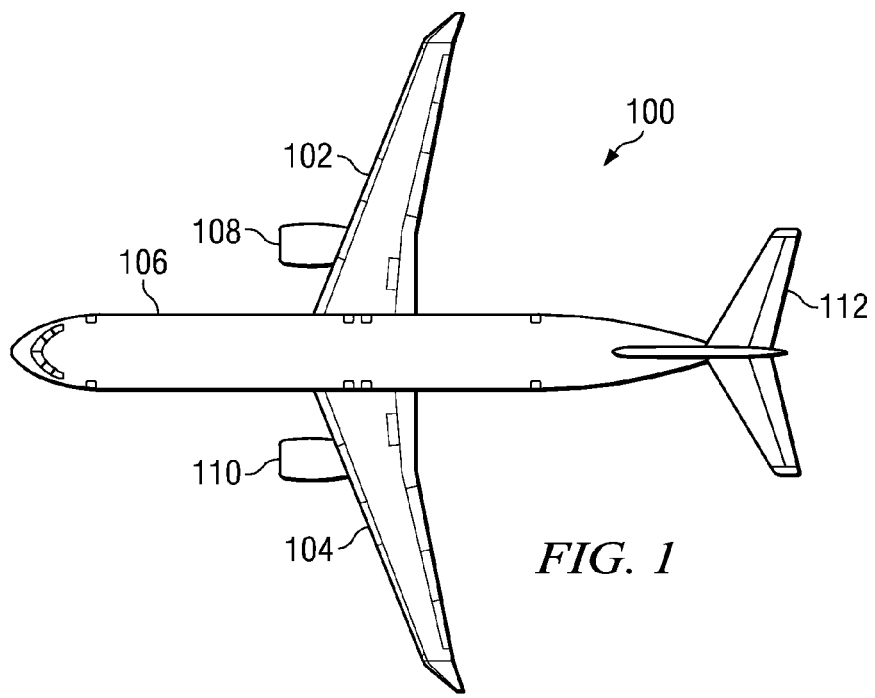
FIG. 1 is a diagram of an aircraft in which an advantageous embodiment may be implemented.

With reference now to the figures, and in particular with reference to FIG. 1, a diagram of an aircraft is depicted in which an advantageous embodiment may be implemented. Aircraft 100 is an example of an aircraft in which a method and apparatus for cross checking required navigation performance procedures may be implemented. In this illustrative example, aircraft 100 has wings 102 and 104 attached to body 106. Aircraft 100 includes wing mounted engine 108, wing mounted engine 110, and tail 112.

Aircraft have many redundant systems to ensure safety for passengers and crew in the aircraft. One example is aircraft typically have two or more flight management systems. These flight management systems operate in conjunction with an autopilot system to operate an aircraft without intervention from a human pilot. For example, a flight management system may execute a procedure to fly an aircraft from one point to another point. The flight management system also may initiate a procedure for landing or takeoff of an aircraft. The flight management system identifies the current location of the aircraft and identifies commands needed to fly the aircraft according to the particular procedure.

The different advantageous embodiments recognize that redundant flight management systems do not provide an ability to independently cross check a required navigation performance procedure to verify that the flight management system is actually flying the aircraft correctly along a selected path. The different advantageous embodiments recognize that independence may not be present for performing a cross check as an additional check to those already made in a flight management system because the same manufacturer typically provides all of the flight management systems for an aircraft. As a result, the same hardware and software is present in the aircraft.

Software and hardware for flight management systems are designed and tested to exacting specifications such that a failure or error during operation is extremely unlikely to occur in an aircraft. Any potential errors that might possibly occur in a flight management system are treated identically by both flight management systems. For example, if on the remote chance one flight management system generates an error because of a software problem in the flight management system, the other flight management system generates the same error because they are identical systems. As another example, if on the remote chance that a component fails, the same error or failure could occur in the corresponding component in the other flight management system. As a result, the different advantageous embodiments recognize that a pilot or other operator of an aircraft does not have another independent method or mechanism for determining whether the flight management systems are performing correctly, in addition to the checks and reassurances that already exist in flight management systems.

In recognizing these problems, the different advantageous embodiments provide a computer implemented method, apparatus, and computer usable program code for cross checking required navigational performance procedures. A required navigational performance procedure is executed in the flight management system in an aircraft. A location signal for the aircraft is received and an independent check of the required navigational performance procedure is executed in an independent data processing system from the flight management system using the location signal during the execution of the required navigational performance procedure to perform a set of results. An indication of whether the current position of the aircraft is within a threshold for the required navigational performance procedure is generated from the set of results. In these examples, the independent data processing system is a data processing system that is different enough from the hardware and/or software in the flight management system to provide a cross check of the required navigation performance procedure being executed by the flight management system. The amount of differences needed between the flight management system and the independent data processing systems may vary depending on the implementation. The differences are sufficient to provide confidence in the cross check of the procedure.

In a different advantageous embodiment, the different processes used for performing the independent cross check may be located in a separate data processing system, such as an electronic flight bag or other independent data processing system. An electronic flight bag is an aircraft computer that displays electronic navigation charts from a separate database. This type of computer provides the pilot with the needed independent cross check to verify that the aircraft is being properly guided by the flight management system along a required navigational approach procedure. This type of information may be displayed on the electronic flight bag itself or through another display connected to the electronic flight bag.

Figure 2:
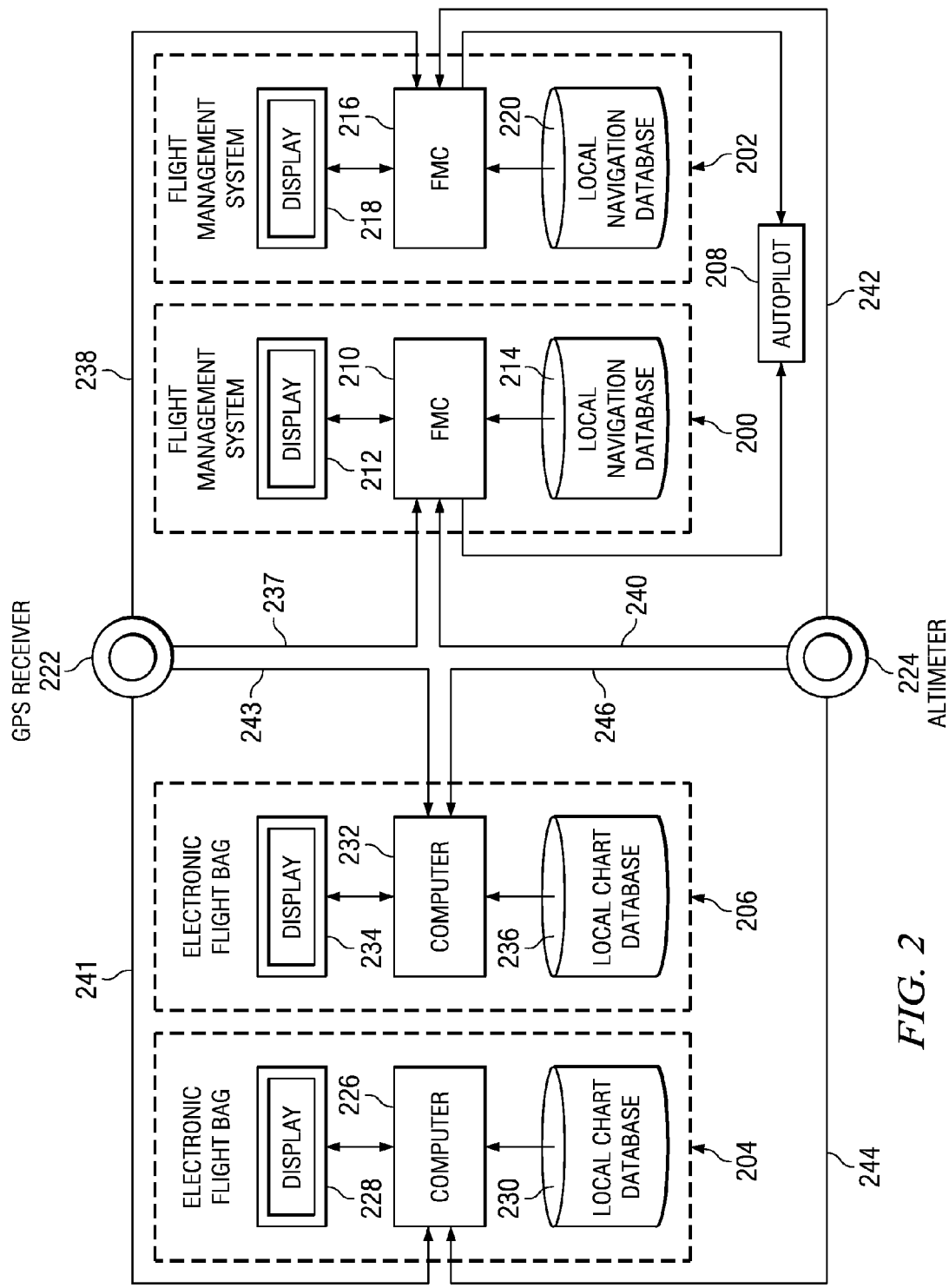
FIG. 2 is a diagram illustrating components used to perform required navigational performance procedures in accordance with an advantageous embodiment.

Turning now to FIG. 2, a diagram illustrating components used to perform required navigational performance procedures is depicted in accordance with an advantageous embodiment. In this example, the different components illustrated in FIG. 2 may be implemented in an aircraft, such as aircraft 100 in FIG. 1.

As depicted, flight management system 200 and flight management system 202 are present along with electronic flight bag 204 and electronic flight bag 206. Flight management system 200 and flight management system 202 connect to auto pilot 208. Auto pilot 208 is a system that may include mechanical, electrical, and/or hydraulic systems used to guide a vehicle without assistance from a human operator.

In theses examples, auto pilot 208 may be implemented using a computer system with the appropriate software to control the various components in the aircraft. In other words, auto pilot 208 may receive commands and information from flight management systems 200 and 202 to guide the aircraft on a path as defined by procedure.

A procedure is a set of points defined in three-dimensional space through which an aircraft may fly in following the procedure. The procedure also may define the speed at which an aircraft flies through the points. A required navigation performance procedure is a procedure in which distances on either side of an aircraft are set, depending on the accuracy required for a particular level of required navigational performance. For example, a required navigation performance level of 0.1 requires a six-hundred feet separation on either side of an aircraft.

Flight management system 200 includes flight management computer 210, display 212, and local navigation database 214. Flight management computer 210 executes the processes and software needed to perform navigation functions and performance management functions. In other words, flight management computer 210 generates the information and commands needed to navigate or direct an aircraft along a path defined by procedure. Display 212 displays information to the user in these examples. Local navigation database 214, in these examples, contains information needed to perform different navigation and performance management functions.

In a similar fashion, flight management system 202 includes flight management computer 216, display 218, and local navigation database 220. Two or more flight management systems, such as flight management systems 200 and 202 are present in an aircraft to provide full redundancy in case one of the systems fails or malfunctions.

In these examples, local navigation databases 214 and 220 may be, for example, Aeronautical Radio, Incorporated (ARINC) 424 navigational databases. Aeronautical Radio, Incorporated 424 is an international standard file format for aircraft navigational data in these examples. Flight management computers 210 and 216 receive input to perform navigational functions from sources, such as, for example, global positioning system (GPS) receiver 222 and altimeter 224. Global positioning system receiver 222 provides location information for the aircraft. Altimeter 224 provides altitude information for the aircraft.

In accordance with advantageous embodiments, additional data processing systems are provided to perform independent cross checks of the procedures being executed by flight management systems 200 and 202. Electronic flight bag 204 includes computer 226, display 228, and local chart database 230. Electronic flight bag 206 includes computer 232, display 234, and local chart database 236. In these examples, computers 226 and 232 in electronic flight bags 204 and 206 are independent data processing systems from flight management computers 210 and 216. For example, computers 226 and 232 may originate from different manufacturers as compared to flight management computers 210 and 216.

Additionally, the software components used on computers 226 and 232 may be different from flight management computers 210 and 216. The differences in hardware and/or software aid in performing independent cross checks. For example, different error or failure occurs in a software and/or hardware component within flight management computer 210 and/or flight management computer 216. The same failure is unlikely to occur in computers 226 and 232.

Further, the information in local chart database 230 and local chart database 236 provide a separate database of information as compared to local navigation databases 214 and 220. In these examples, the databases are different types of databases using different formats. As a result, the information, software, and/or hardware located in electronic flight bags 204 and 206 may be sufficiently different from the hardware and/or software in flight management systems 200 and 202 to provide an independent cross check of the procedures executed by flight management systems 200 and 202.

In these examples, computers 226 and 232 receive location information from global positioning system receiver 222 and altitude information about the aircraft from altimeter 224. In these examples, information is received from these components through a separate path as compared to flight management systems 200 and 202. For example, global positioning system receiver 222 sends global positioning data to flight management systems 200 and 202 through paths 237 and 238, while global position information is sent to electronic flight bags 204 and 206 through paths 241 and 243. Altimeter 224 sends altitude information to flight management system 200 through path 240 and altitude information to flight management system 202 through path 242. Altimeter 224 sends altitude information to electronic flight bag 204 through path 244 and altitude information to electronic flight bag 206 through path 246.

In these examples, either or both computer 226 and computer 232 may perform cross checks of procedures being executed by flight management computers 210 and 216. A determination may be made as to whether the position of the aircraft as identified by computers 226 and 232 are within thresholds for particular required navigational performance procedures being executed by the aircraft. Indications or alerts may be generated as to whether the location of the aircraft is within a desired or selected threshold. The information generated in performing the cross checks may be displayed on displays 228 and/or 234.

Figure 3:
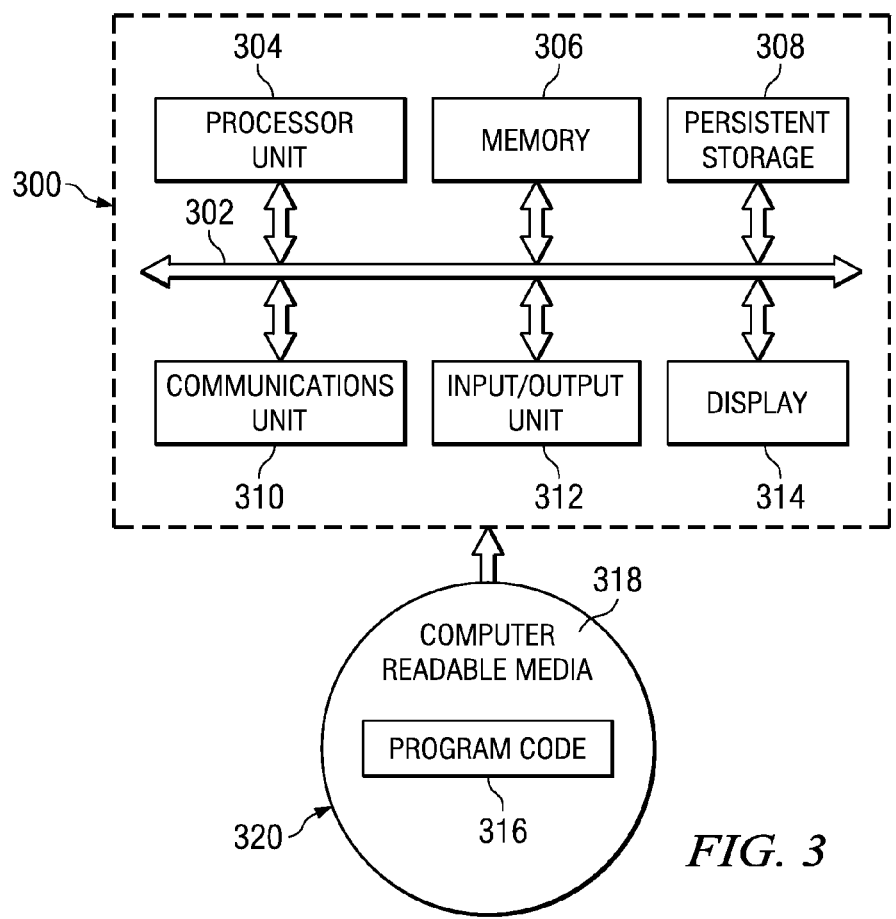
FIG. 3 is a diagram of a data processing system in accordance with an advantageous embodiment.

Turning now to FIG. 3, a diagram of a data processing system is depicted in accordance with an advantageous embodiment. Data processing system 300 is an example of a data processing system that may be used to implement computers, such as flight management computer 210, flight management computer 216, computer 226, and computer 232 in FIG. 2.

Under the different advantageous embodiments, the architecture, hardware, and/or software used in data processing system 300 in FIG. 3 is used to implement an electronic flight bag where independent cross checking data processing systems will vary from those in a flight management computer for a flight management computer system.

In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306, in these examples, may be, for example, a random access memory or any other suitable volatile or non-volatile storage device. Persistent storage 308 may take various forms depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive or a flash memory that is connected to data processing system 300. The tangible form of computer readable media 318 is also referred to as computer recordable storage media.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308 and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache, such as found in an interface and memory controller hub that may be present in communications fabric 302.

Figure 4:
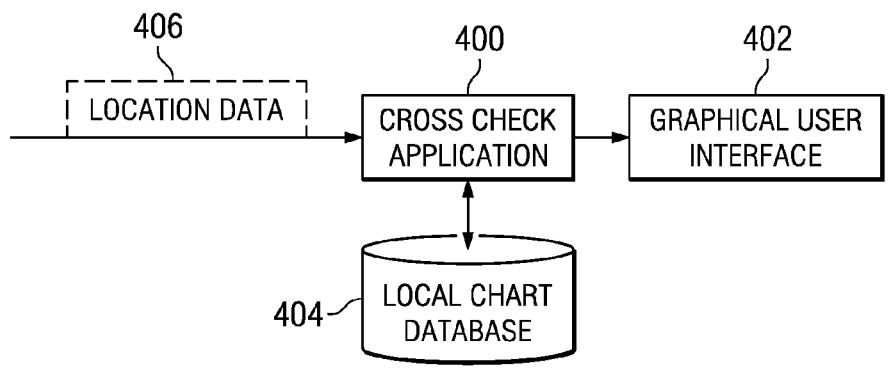
FIG. 4 is a diagram illustrating software components used for performing cross checks of required navigational performance procedures in accordance with an advantageous embodiment.

With reference next to FIG. 4, a diagram illustrating software components used to perform cross checks of required navigational performance procedures is depicted in accordance with an advantageous embodiment. Cross check application 400 and graphical user interface 402 are examples of software components that may be executed by computer 226 in electronic flight bag 204 and/or computer 232 in electronic flight bag 206. Local chart database 404 is an example of local chart database 230 and/or local chart database 236 in FIG. 2.

In this example, cross check application 400 may be operated by a user through graphical user interface 402. Graphical user interface 402 allows a user to initiate a cross check process. Additionally, graphical user interface 402 may display results of the cross check as it is being performed during flight of the aircraft. Cross check application 400 may receive location data 406 from various sources. For example, location data 406 may be a global positioning system signal generated by global positioning system receiver 222 in FIG. 2.

Additionally, location data 406 also may include other information, such as altitude from an altimeter, such as altimeter 224 in FIG. 2. Cross check application 400 may use location data 406 in local chart database 404 to determine the location of the aircraft with respect to a geographic location within local chart database 404.

With this information, cross check application 400 may present a display of the location of the aircraft with respect to various geographic features while the aircraft is executing a required navigational performance procedure. In these examples, the cross checking performed by cross check application 400 may be initiated by a user. The user may select the same approach procedure through graphical user interface 402.

The process executed by cross check application 400 occurs at the same time a flight management system executes a required navigational performance procedure. This procedure may be, for example, an approach procedure.

Cross check application 400 may display the required navigational performance route defined by the procedure on graphical user interface 402. In the different advantageous embodiments, cross check application 400 may provide a graphical indication of whether the aircraft is within a threshold for the required navigational performance procedure.

As an example, containment lines may be displayed for a particular required application performance level being used for the approach. These containment lines may provide the graphical indication of whether the aircraft is within the threshold for the required navigation performance procedure being executed when compared to the graphical icon for the aircraft. Other information, such as, for example, associated trend, obstacles, other aircraft, and other suitable geographical information may be displayed in graphical user interface 402.

Figure 5:
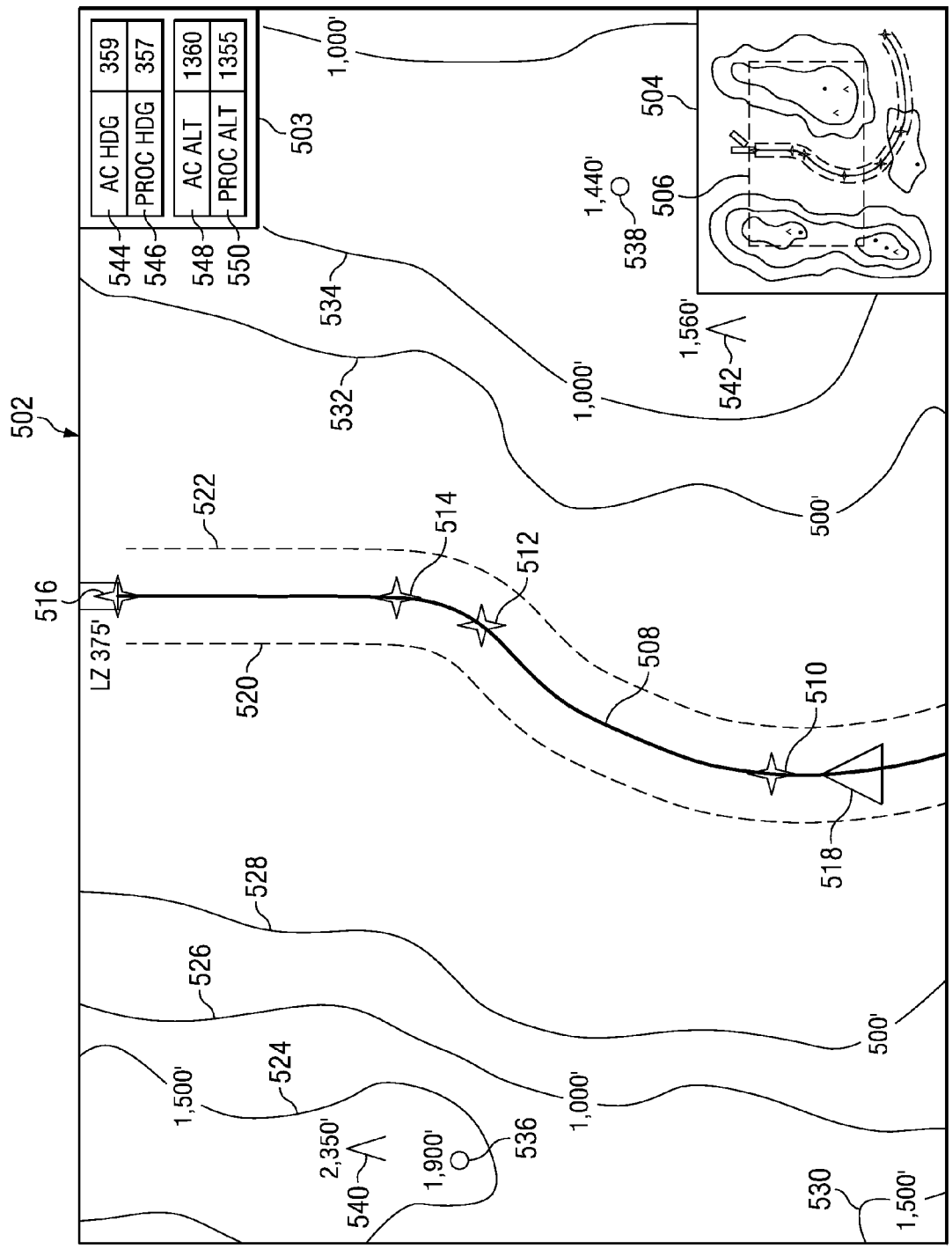
FIG. 5 is an illustration of a graphical user interface for cross checking required navigation performance procedures in accordance with an advantageous embodiment.

Turning now to FIG. 5, an illustration of a graphical user interface for cross checking required navigation performance procedures is depicted in accordance with an advantageous embodiment. In this example, display 500 is an example of a graphical user interface that may be presented through graphical user interface 402 in FIG. 4 in response to a cross check performed by cross check application 400 in FIG. 4. In this example, sections 502, 503, and 504 are present in display 500. Display 500 is a moving map, in these examples. A moving map is a display in which the map and a graphical icon representing an aircraft is present in which the aircraft moves to show the current position of the aircraft on the map.

In section 502 is an electronic flight bag display window that displays the progress of an aircraft in a particular zoom setting or level of detail. Section 503 presents performance information about the aircraft. Section 504 is a procedure overview window that displays the overall route for the particular procedure. This type of display in section 504 also is referred to as a thumbnail, which is a reduced version of a moving map, in these examples. As depicted, boundary 506 in section 504 identifies the information displayed within section 502 of display 500.

In this illustrative example, route 508 is a required navigation performance route generated for a particular required navigation performance procedure. Way points 510, 512, 514, and 516 illustrate way points defined for the procedure. These way points may have a location in three-dimensional space. Graphical icon 518 is a symbol representing the location and direction of the aircraft along route 508 in this example. Way point 512 provides a location of the aircraft relative to route 508 for the required navigational performance procedure.

Containment line 520 and containment line 522 identify the amount of space that may be present on either side of route 508. The amount of space present may vary depending on the precision of a particular required navigational procedure unit.

In these examples, if the actual location of the aircraft, as indicated by graphical icon 518, deviates such that graphical icon 518 comes within some predetermined distance, touches, or crosses containment lines 520 or 522, an alert may be presented. This alert may be, for example, a visual and/or audio alert.

In addition, section 502 also displays geographical information, such as topographical information about the terrain. In these examples, contour lines 524, 526, 528, 530, 532, and 534 provide information about the height of the terrain. These contour lines provide height information. Further, points 536 and 538 indicate the highest point for the particular area within contour lines 524 and 534, respectively.

Moreover, other information, such as obstacles also may be displayed. In these examples, towers 540 and 542 are displayed to identify obstacles that may be present. Of course, other information also may be displayed. For example, any other aircraft within the area displayed in the section may be presented within section 502.

Section 503 may present additional information to an operator. In these examples, section 503 displays aircraft performance information. This aircraft performance information includes, for example, actual heading in section 544, the procedure heading in section 546, the actual altitude in section 548, and the procedure altitude in section 550.

The actual heading in section 544 may be identified from data received from a global positioning sensor. The heading of the aircraft that should actually be used is identified from the procedure itself and presented in section 546. The actual altitude in section 548 may be obtained from the altimeter in the aircraft. The procedure altitude in section 550 is the altitude that should be used by the aircraft from the required navigational performance procedure information.

In this manner, an operator of an aircraft may monitor information displayed on the flight management system and on the electronic flight bag while the aircraft is being flown along a required navigational procedure route. The operator of an aircraft may be able to identify inconsistencies that may occur. Further, by presenting alerts, the electronic flight bag display generates alerts when an aircraft has deviated too far from the route based on some policy. This alert may allow the operator to check the flight management system to determine whether a problem or unexpected deviation has occurred.

Figure 6:
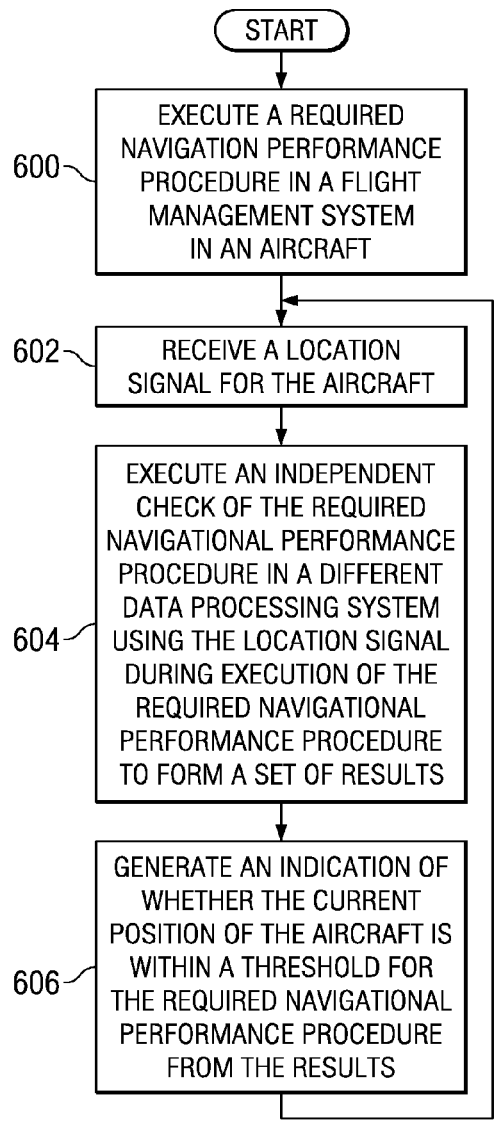
FIG. 6 is a high-level flowchart of a process for performing a cross check of a required navigation performance procedure in accordance with an advantageous embodiment.

Turning now to FIG. 6, a high-level flowchart of a process for performing a cross check of a required navigation performance procedure is depicted in accordance with an advantageous embodiment. The process begins by executing a required navigation performance procedure in a flight management system in an aircraft (operation 600). This procedure may be, for example, a landing procedure on a runway. Required navigational performance approaches are, in these examples, a specific type of landing procedure. Other flight procedures include, for example, precision approaches such as an ILS procedure or non-precision approaches such as GPS, NDB, or VOR approaches. The different advantageous embodiments can be used with other required navigational performance procedures, such as standard instrument departures, standard arrival procedures, missed approach procedures, and engine out procedures. Thereafter, the process receives a location signal for the aircraft (operation 602). The process executes an independent check of the required navigational performance procedure in an independent data processing system using the location signal during the execution of the required navigational performance procedure to form a set of results (operation 604). In these examples, this process may be executed in an electronic flight bag, such as electronic flight bag 204 in FIG. 2.

The process then generates an indication of whether the current position of the aircraft is within a threshold for the required navigational performance procedure from the aircraft (operation 606). The process continues to repeat until terminated by the pilot. An indication may be generated through a graphical user interface displaying a display, such as display 500 in FIG. 5. The indication may be made by identifying whether the location of the aircraft is between the containment lines. If the location of the aircraft moves within some predetermined distance of the containment lines, an alert may be generated. This alert may be, for example, changing the display of the aircraft to another color, such as yellow. The containment line could be changed in color.

Further, the containment line and/or the graphical indicator for the aircraft may be animated. Additionally, different levels of indicators or alerts may be generated. For example, yellow may be used if the aircraft moves within some distance of a containment line but does not touch or cross the containment line.

If the aircraft touches the containment line, then another color, such as, for example, red may be used. With this type of indicator, the pilot may change the operation of the aircraft to take into account the deviation. For example, the pilot may initiate a missed approach procedure. In these examples, operations 602, 604, and 606 are performed continuously during the execution of the required navigation performance procedure.

Figure 7:
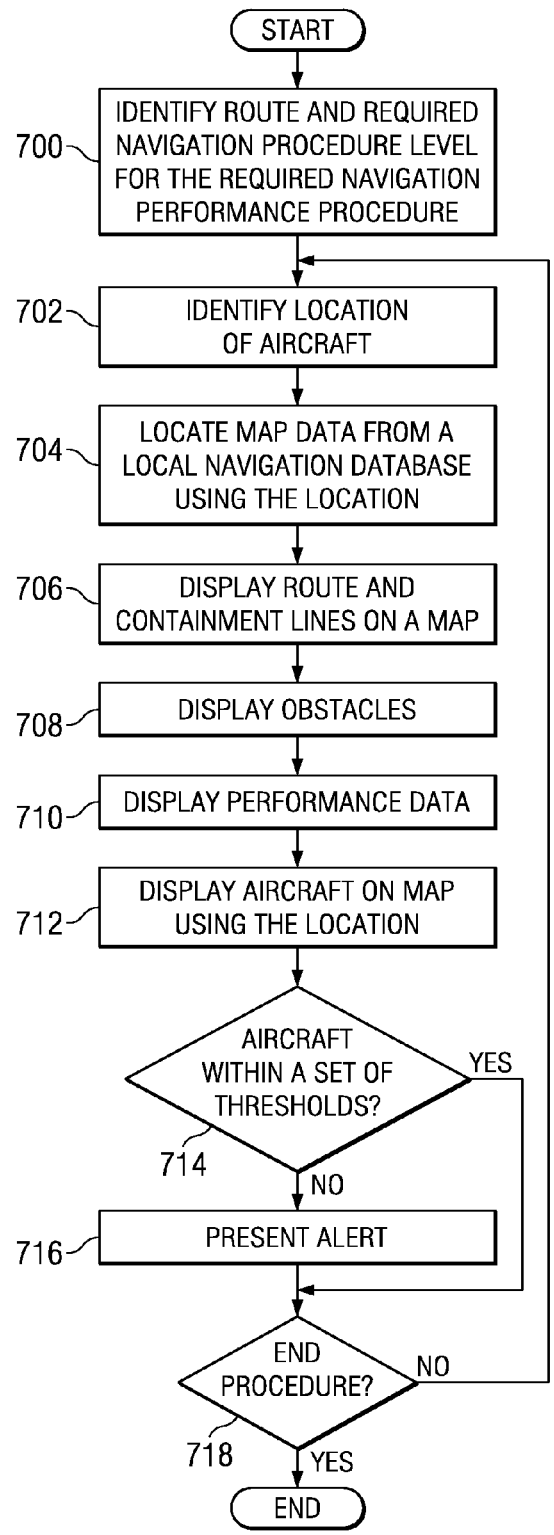
FIG. 7 is a flowchart of a process for displaying a required navigation performance procedure in accordance with an advantageous embodiment.

Turning now to FIG. 7, a flowchart of a process for displaying a required navigation performance procedure is depicted in accordance with an advantageous embodiment. The process illustrated in FIG. 7 may be implemented in an electronic flight bag, such as electronic flight bag 204 in FIG. 2. More specifically, the process may be implemented in a software component, such as cross check application 400 in FIG. 4.

The process begins by identifying a route and required navigation procedure level for the required navigation performance procedure (operation 700). This identification of operation 700 may be made through a user input selecting the appropriate procedure.

Further, the required navigation performance level may be selected based on a user input identifying level or based on a selection of the aircraft being used. Thereafter, the process identifies the location of the aircraft (operation 702). This location may be identified from a global positioning signal received by the electronic flight bag on which the process executes in this example.

Next, map data is located from a local navigation database using the location (operation 704). The identified route and containment lines are displayed on a map (operation 706). The displayed map is generated using the data obtained from the local navigation database. Thereafter, the process displays obstacles (operation 708). These obstacles are identified from the local navigation database. The obstacles may take various forms. For example, the obstacles may be, for example, communications towers, mountains, or other objects that may be tall enough to provide a potential hazard to the aircraft.

Next, performance data may be displayed (operation 710). This performance data may be performance data such as that illustrated in section 503 in display 500 in FIG. 5. The aircraft is then displayed on the map using the location (operation 712). In these examples, the aircraft is presented using a graphical icon that allows for direction of the aircraft to be identified. The process then determines whether the aircraft location is within a set of thresholds based on the required navigation performance procedure being executed (operation 714). If the aircraft is not within the set of thresholds, an alert is presented (operation 716).

A determination is then made as to whether the procedure has ended (operation 718). If the procedure has not ended, the process returns to operation 702 as described above. Otherwise, the process terminates. With reference again to operation 714, if the aircraft is within the set of thresholds, the process proceeds to operation 718 as described above.

The process in FIG. 7 is performed in a manner that an operation of the aircraft can see the movement of the aircraft on the display generated by the process. If the operator of the aircraft notices that the position of the aircraft with respect to the required navigation performance procedure does not match that of the one being presented and executed by the flight management system, the operator may then take other actions. For example, the operator may abort the required navigation performance procedure, or the operator may continue to monitor the differences. The operator also may make a visual check or use other instrumentation to determine whether other actions need to be taken.

Figure 8:
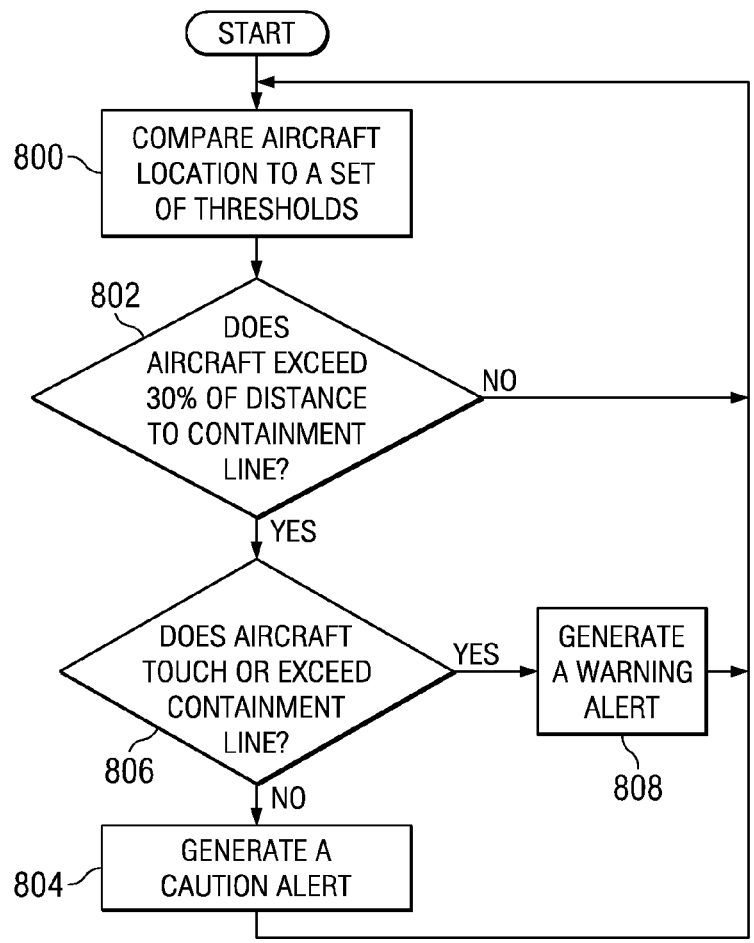
FIG. 8 is a flowchart of a process for generating alerts in accordance with an advantageous embodiment.

Turning now to FIG. 8, a flowchart of a process for generating alerts is depicted in accordance with an advantageous embodiment. The process illustrated in FIG. 8 is a more detailed example of operations 714 and 716 in FIG. 7.

The process begins by comparing the location of the aircraft to a set of thresholds (operation 800). In these examples, the set of thresholds is two threshold values. In other embodiments, other numbers of thresholds may be used. For examples, a single threshold may be used or four threshold levels may be used.

Next, a determination is made as to whether the aircraft has exceeded thirty percent of the distance between the route and the closest containment line (operation 802). The value 30 percent is merely an example of a threshold that may be selected. Other threshold values may be used, depending on the particular implementation.

If the aircraft has not exceeded this threshold, the process returns to operation 800. If, however, the aircraft has exceeded thirty percent of the distance between the route and the closest containment line, then the process determines whether or not the aircraft has touched or exceeded the closest containment line (operation 806). If the aircraft has not touched or exceeded the closest containment line, then a caution alert is generated (operation 804). In these examples, the caution alert may be, for example, a yellow flashing box symbol. The flashing symbol may be the graphical icon for the aircraft itself being displayed on the display.

Another alert, in addition to the aircraft, may be displayed in a flashing manner in other embodiments. The manner in which the alert is presented may differ in different implementations. The alerts are intended to gain the attention of the user. The process then returns to operation 800 as described above.

With reference again to operation 806, if the aircraft has exceeded the containment line, a warning alert is generated (operation 808) with the process returning to operation 800. This warning alert may be an alert presented in a similar fashion to that in operation 804.

In this type of alert, however, a different color, such as red, may be used. Of course, other types of alerts may be used. In addition to or in place of a different color, a different graphical icon may be used to present the alert. With reference again to operation 806, if the aircraft does not exceed the containment line, the process returns to operation 800. In these examples, this process operates continually and each alert is cancelled after some selected period of time. The alert is reinitiated if the aircraft continues to exceed one or more of the thresholds. For example, if a caution alert is generated in operation 804, the caution alert only is presented for some period of time.

As the process returns to operation 800 and operation 802, if the aircraft no longer exceeds that threshold, the alert is not again generated. If the aircraft continues to exceed the threshold, then the alert is again generated. These alerts also may include audio alerts presented with or in place of the visual alerts.

In other implementations, the alert may be continually presented until a different determination is made. When these alerts are generated, a user may then view the results being presented or generated by the flight management system to determine whether a difference in results is present. Based on this type of review, the operator of the aircraft may take various actions. These actions include, for example, performing additional checks to verify the location of the aircraft, avoiding the required navigation performance procedure, or taking no additional action.

Thus, the different advantageous embodiments provide a computer implemented method, apparatus, and computer program product for cross checking required navigation performance procedures. In the different embodiments, a required navigation performance procedure is executed in a flight management system in an aircraft. A location signal for the aircraft is received. An independent check of the required navigation performance procedure is executed in an independent data processing system from the flight management system using the location signal during the execution of the required navigation performance procedure to form a set of results. An indication of whether the current position of the aircraft is within a threshold for the required navigation performance procedure is generated from the set of results.

The different advantageous embodiments can take the form of an entirely hardware embodiment, an entirely software embodiment or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. For example, in the depicted examples, an electronic flight bag is used as an independent data processing system.

In different advantageous embodiments, any type of independent data processing system may be used in addition to an electronic flight bag. Also, the different advantageous embodiments may be applied to other vehicles other than an aircraft. For example, the different embodiments may be applied to navigation procedures used for boats, submarines, and spacecraft.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for cross checking required navigation performance procedures, the method comprising:
   executing a required navigation performance procedure, the required navigation performance procedure generated in a flight management system in an aircraft, the procedure comprising navigation information for the aircraft from a first global positioning system signal received in the flight management system through a first path, executing the required navigation performance procedure includes the use of data from a local navigation database;
   receiving an independent global positioning system signal in an independent data processing system located onboard the aircraft, the independent global positioning system signal received from a path independent of any positioning signal received by the flight management system;
   presenting a current position of the aircraft based on the independent global positioning system signal on a moving map;
   cross checking, on the independent data processing system, the navigation information for the required navigation performance procedure determined by the flight management system with the current position of the aircraft determined by the independent data processing system, the cross checking performed while the aircraft executes the required navigation performance procedure, the current position of the aircraft determined by the independent data processing system includes the use of data from a local chart database, the local chart database different from the local navigation database; and
   displaying a set of containment lines on the moving map to indicate whether deviations from the required navigation performance procedure have occurred.

2. The method of claim 1 further comprising:
   displaying a thumbnail of a route for the required navigation performance procedure; and
   displaying the current position of the aircraft on the route for the required navigation performance procedure, the current position based on the independent global positioning system signal.

3. The method of claim 1 further comprising:
   presenting a warning if the aircraft has exceeded a containment line in the set of containment lines.

4. The method of claim 3, wherein the warning is one of a warning displayed on the moving map and an audible warning.

5. The method of claim 1 further comprising:
   altering the required navigation performance procedure for the aircraft by an operator of the aircraft if a deviation of the aircraft from the required navigation performance procedure is greater than a threshold.

6. The method of claim 1 wherein the navigation performance procedure comprises an approach procedure.

7. The method of claim 1 further comprising displaying performance information of the aircraft including actual heading, actual altitude, heading from the required navigation performance procedure, and altitude from the required navigation performance procedure.

8. The method of claim 1 further comprising displaying information from a local chart database.

9. A computer implemented method for cross checking required navigation performance procedures, the computer implemented method comprising:
executing a required navigation performance procedure, the required navigation performance procedure generated in a flight management system in an aircraft, the procedure comprising navigation information for the aircraft from a first global positioning system signal received in the flight management system through a first path, executing the required navigation performance procedure includes the use of data from a local navigation database;
receiving an independent global positioning satellite location signal for the aircraft, the independent global positioning system signal received from a path independent of any positioning signal received by the flight management system;
executing an independent check of the navigation information of the required navigation performance procedure in an independent data processing system from the flight management system with a current position of the aircraft determined by the independent data processing system, the executing an independent check occurring during execution of the required navigation performance procedure to form a set of results, the current position of the aircraft determined by the independent data processing system includes the use of data from a local chart database, the local chart database different from the local navigation database; and
generating an indication of whether the current position of the aircraft is within a threshold for the required navigation performance procedure from the set of results.

10. The computer implemented method of claim 9, wherein the generating step comprises:
displaying a moving map with a set of containment lines from the navigation information of the required navigation performance procedure; and
displaying the current position of the aircraft based on the independent global positioning satellite system signal received from a path independent of any positioning signal received by the flight management system, on the moving map.

11. The computer implemented method of claim 10, further comprising:
presenting a warning if the current position of the aircraft has exceeded a containment line in the set of containment lines.

12. The computer implemented method of claim 9, wherein the independent data processing system may be selected from one of a portable data processing system onboard the aircraft or a data processing system installed in the aircraft.

13. An apparatus comprising:
a flight management system capable of executing a required navigation performance procedure generated in a flight management system, the procedure comprising navigation information for the aircraft from a first global positioning system signal received in the flight management system through a first path, executing the required navigation performance procedure includes the use of data from a local navigation database; and
a data processing system independent of the flight management system, wherein the data processing system receives an independent global positioning location signal for an aircraft, the independent global positioning location signal received from a path independent of any positioning signal received by the flight management system; executes an independent check of the navigation information of the required navigation performance procedure in an independent data processing system from the flight management system with a current position of the aircraft determined by the independent data processing system during execution of the required navigation performance procedure to form a set of results, the current position of the aircraft determined by the independent data processing system includes the use of data from a local chart database, the local chart database different from the local navigation database; and generates an indication of whether the current position of the aircraft is within a threshold for the required navigation performance procedure from the set of results.

14. The apparatus of claim 13, further comprising:
the aircraft.

15. The apparatus of claim 14, further comprising:
a global positioning system in the aircraft capable of generating the location signal.

16. A non-transitory computer program product for cross checking required navigation performance procedures, the computer program product comprising:
program code, stored on computer readable media, for executing a required navigation performance procedure, the required navigation performance procedure generated in a flight management system in an aircraft, the procedure comprising navigation information for the aircraft from a first global positioning system signal received in the flight management system through a first path, executing the required navigation performance procedure includes the use of data from a local navigation database;
program code, stored on the computer readable media, for receiving an independent global positioning satellite location signal for the aircraft, the independent global positioning satellite location signal received from a path independent of any positioning signal received by the flight management system;
program code, stored on the computer readable media, for executing an independent check of the navigation information of the required navigation performance procedure in an independent data processing system from the flight management system with a current position of the aircraft determined by the independent data processing system, the executing an independent check occurring during execution of the required navigation performance procedure to form a set of results, the current position of the aircraft determined by the independent data processing system includes the use of data from a local chart database, the local chart database different from the local navigation database; and
program code, stored on the computer readable media, for generating an indication of whether the current position of the aircraft is within a threshold for the required navigation performance procedure from the set of results.

17. The computer program product of claim 16, wherein the program code, stored on the computer readable media, for generating the indication of whether the current position of the aircraft is within the threshold for the required navigation performance procedure from the set of results comprises:
  program code, stored on the computer readable media, for displaying a moving map with a set of containment lines from the navigation information of the required navigation performance procedure; and
  program code, stored on the computer readable media, for displaying the current position of the aircraft based on the independent global positioning satellite location signal received from a path independent of any positioning signal received by the flight management system, on the moving map.

18. The computer program product of claim 17, further comprising:
  program code, stored on the computer readable media, for presenting a warning if the current position of the aircraft has exceeded a containment line in the set of containment lines.

19. The computer program product of claim 16, wherein the independent data processing system may be selected from one of a portable data processing system onboard the aircraft or a data processing system installed in the aircraft.

\* \* \* \* \*